United States Patent
Reisch et al.

(10) Patent No.: US 10,514,072 B2
(45) Date of Patent: Dec. 24, 2019

(54) FRICTION ELEMENT FOR A FRICTIONAL SHIFTING ELEMENT FOR A VEHICLE TRANSMISSION

(71) Applicant: ZF Friedrichshafen AG, Friedrichshafen (DE)

(72) Inventors: Matthias Reisch, Ravensburg (DE); Christian Sibla, Eriskirch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 132 days.

(21) Appl. No.: 15/741,597

(22) PCT Filed: Jun. 7, 2016

(86) PCT No.: PCT/EP2016/062821
§ 371 (c)(1),
(2) Date: Jan. 3, 2018

(87) PCT Pub. No.: WO2017/005432
PCT Pub. Date: Jan. 12, 2017

(65) Prior Publication Data
US 2018/0187726 A1      Jul. 5, 2018

(30) Foreign Application Priority Data
Jul. 7, 2015 (DE) .................. 10 2015 212 667

(51) Int. Cl.
*F16D 13/64* (2006.01)
*F16D 13/69* (2006.01)
*F16D 23/06* (2006.01)

(52) U.S. Cl.
CPC .......... *F16D 13/648* (2013.01); *F16D 13/69* (2013.01); *F16D 23/06* (2013.01);
(Continued)

(58) Field of Classification Search
CPC ........ F16D 13/648; F16D 13/69; F16D 23/06; F16D 2023/0643; F16D 2023/0656;
(Continued)

(56) References Cited

U.S. PATENT DOCUMENTS 3,412,836 A * 11/1968 Wilmer ................... F16D 13/64
                                                              188/218 XL
6,026,944 A    2/2000 Satou et al.
(Continued)

FOREIGN PATENT DOCUMENTS

DE     1721489 U     5/1956
DE     20011435 U1  11/2000
(Continued)

OTHER PUBLICATIONS

German Search Report DE102015212667.6, dated Mar. 1, 2016. (10 pages).
(Continued)

*Primary Examiner* — Tinh Dang
(74) *Attorney, Agent, or Firm* — Dority & Manning, P.A.

(57) ABSTRACT

A friction element (1, 3) for a frictional shift element for a transmission of a vehicle, the friction element having an annular base body with a plurality of friction surface elements (5), the plurality of friction surface elements (5) protruding radially inwardly or radially outwardly and are distributed over a periphery of the annular base body. The friction element (1, 3) and the plurality of friction surface elements (5) are each formed as one piece.

15 Claims, 14 Drawing Sheets

(52) U.S. Cl.
CPC .............. *F16D 2023/0643* (2013.01); *F16D 2023/0656* (2013.01); *F16D 2200/0021* (2013.01); *F16D 2250/0076* (2013.01)

(58) Field of Classification Search
CPC ..... F16D 2200/0021; F16D 2250/0076; F16D 2250/0061
See application file for complete search history.

(56) References Cited

U.S. PATENT DOCUMENTS

| | | | | |
|---|---|---|---|---|
| 6,719,110 | B2* | 4/2004 | Ishikawa | F16D 25/123 |
| | | | | 192/113.34 |
| 7,137,490 | B2* | 11/2006 | Fabricius | F16D 13/648 |
| | | | | 188/250 D |
| 7,478,719 | B2* | 1/2009 | Voegele | F16D 13/648 |
| | | | | 192/107 R |
| 8,919,518 | B2* | 12/2014 | Diemer | F16D 13/52 |
| | | | | 192/70.28 |
| 9,097,289 | B2* | 8/2015 | Youngwerth | F16D 13/648 |
| 9,206,866 | B2 | 12/2015 | Giese et al. | |
| 9,404,541 | B2 | 8/2016 | Hoppe et al. | |
| 9,841,065 | B2* | 12/2017 | Okamura | F16D 13/74 |
| 9,856,922 | B2* | 1/2018 | Reisch | F16D 13/648 |
| 9,909,628 | B2* | 3/2018 | Bauer | F16D 23/06 |
| 9,982,748 | B2* | 5/2018 | Yin | F16F 15/1201 |
| 2004/0099493 | A1* | 5/2004 | Himmelsbach | F16D 65/0006 |
| | | | | 188/250 B |
| 2004/0195068 | A1 | 10/2004 | Sudau | |
| 2005/0126878 | A1* | 6/2005 | Samie | F16D 13/64 |
| | | | | 192/113.36 |
| 2008/0156601 | A1 | 7/2008 | Himmelsbach et al. | |
| 2011/0290609 | A1 | 12/2011 | Ziemer et al. | |
| 2012/0228077 | A1 | 9/2012 | DeGowske | |
| 2014/0144747 | A1 | 5/2014 | Hemphill et al. | |
| 2018/0051754 | A1* | 2/2018 | Lindemann | F16D 13/648 |
| 2019/0048954 | A1* | 2/2019 | Bernhardt | F16D 13/74 |

FOREIGN PATENT DOCUMENTS

| | | |
|---|---|---|
| DE | 10315169 A1 | 11/2004 |
| DE | 102009001101 A1 | 8/2010 |
| DE | 102009027017 A1 | 12/2010 |
| DE | 102011010912 A1 | 8/2012 |
| DE | 102012102039 A1 | 9/2012 |
| DE | 102012206678 A1 | 11/2012 |
| DE | 102013222760 A1 | 5/2014 |
| DE | 102013216747 A1 | 2/2015 |
| DE | 102014200854 A1 | 7/2015 |
| EP | 0945636 A2 | 9/1999 |
| EP | 1650454 A1 | 4/2006 |
| GB | 814992 A | 6/1959 |

OTHER PUBLICATIONS

International Search Report (English Translation) PCT/EP2016/062821, dated Sep. 6, 2016. (2 pages).

* cited by examiner

FRICTION ELEMENT FOR A FRICTIONAL SHIFTING ELEMENT FOR A VEHICLE TRANSMISSION

FIELD OF THE INVENTION

The present invention relates to a friction element for a frictional shift element for a transmission of a vehicle, said friction element including an annular base body, wherein the annular base body has a plurality of friction surface elements, the friction surface elements protrude radially inwardly or radially outwardly and are arranged so as to be distributed over the periphery of the friction element.

BACKGROUND

The friction element, for example, an internal or external disk or the like, is provided for a frictional shift element for transmission, in particular, an automatic transmission of a vehicle. The friction element may be allocated to a first carrier, for example, an internal multi-disk carrier or an external multi-disk carrier. A plurality of friction elements may form a multi-disk pack, wherein an internal disk and an external disk are arranged alternately in the axial direction one behind the other and can be pressed against each other through an actuation in the engaged state of the frictional shift element, in order to implement the transmission of torque between each of the packs of the first and second friction elements.

For example, a transmission with a plurality of frictionally engaging shift elements for obtaining various gear ratios is known from the published document DE 10 2009 001 101 A1. The frictionally engaging shift elements are disk shift elements, wherein the internal disks and the external disks have unlined friction surfaces in order to increase the permissible surface pressure, so that the shift element can be made smaller in size with the same ability to transmit the torque and causes lower drag torque in the disengaged operating condition.

Furthermore, the published document DE 10 2009 027 017 A1 discloses a multi-disk pack for a multi-disk brake or a multi-disk clutch, in which a spring action is integrated into the disks, so that a desired distance between the disks is also provided in the disengaged operating condition of the multi-disk pack. This arrangement results in a clearance in the entire multi-disk pack.

DE 10 315 169 A1 discloses a clutch assembly, in which friction lining-carrying friction elements and friction elements without a friction lining interact and in which the friction lining-carrying friction elements have a fluid transport surface arrangement for generating a fluid circulation, which flows around the friction elements and which is implemented predominantly by the friction surface elements that are arranged so as to be distributed over the periphery of the friction element.

GB 8 14 992 A discloses a friction element, which includes a disk and friction linings on both sides of the disk, wherein a part of the friction lining is connected to a spring element on at least one side of the disk, wherein the friction linings are connected to a friction lining carrier of the friction element by adhesive bonding or by riveting.

One drawback of the friction element used in these frictional shift elements is that there may still be high drag torque. The yet unpublished DE 10 2014 200 854 of the applicant shows a frictional shift element with a low drag torque. This feature is achieved by dispensing with friction linings and by forming the friction surface element in one piece, i.e., integrally forming the friction surface element on the friction element. One disadvantage lies in the still fairly high consumption of material for the manufacture of the friction elements of a frictional shift element. In addition, the friction elements have to be made of the same material as the friction surface elements.

Furthermore, EP 1 650 454 A1 discloses support plates of friction disks, which are made of several segments in order to cut costs; and, as a result, there is less punching waste.

SUMMARY OF THE INVENTION

The object of the present invention is to propose a friction element for a transmission of a vehicle that is manufacturable as cost effectively as possible, causes the least possible drag torque, and consumes less material in production and, therefore, improves the already advantageous invention from DE 10 2014 200 854 even more. Moreover, another aspect of the present invention is to provide a method for manufacturing that is cost effective and reduces the amount of material used.

This is achieved, according to the invention, in that both the friction element and also the respective friction surface elements are formed as one piece each.

One drawback in the prior art is that the friction surface elements and the approximately annular base body in integrally formed embodiments are necessarily made of the same material. If the material-related requirements with respect to optimum wear, strength, coefficient of friction profile and drag torque characteristics were to be satisfied, the entire disk would have to be made necessarily of a high quality material. Since the disk has a very large surface area, as compared to the friction surface, a large consumption of high quality material is required. Owing to the "multi-part" design of the friction element and the friction surface element, wherein each approximately tooth-shaped friction surface element is formed on the annular base body of the friction element, it is possible to use different materials or stock. In particular, the material for the friction element may be of a lower grade material that is considerably cheaper than the material for the rubbing friction surface elements.

It has also been found that it is possible, according to the solution of the invention, to manufacture, for example, the internal disk from the "punching waste" of the external disk, since the parts do not overlap radially. That is, there is no radial overlap between the approximately annular base body of the one disk and the friction disk with the annular friction surface. The friction contact is achieved exclusively by the friction surface elements arranged on the annular body. In this way, the punching waste is significantly reduced, an aspect that results in a huge reduction in cost.

The advantage of the friction surface elements, which protrude radially into the overlap area, is that the contact surface or the corresponding friction surfaces between the two friction elements is/are reduced by repeatedly interrupting in the circumferential direction the friction surface through the provision of individual friction lugs or friction teeth on the friction element, thus, either on the internal or external disk. The interruptions in the circumferential direction are implemented, for example, by recesses between the provided friction surface elements or, more specifically, the friction lugs or friction teeth.

The friction element, according to the invention, can interact, for example, with another friction element in a frictionally engaging manner, wherein the annular base body can be spaced apart from a base body of the other friction element in the radial direction, irrespective of the respective protruding friction surface elements, in order to reduce the overlap area or, more specifically, to reduce the overlapping friction surfaces. This arrangement allows the coolant and/or lubricant, for example, oil or the like, to pass through in radial direction virtually unimpeded. Furthermore, the contact surface, in which drag torques are generated through the shearing of the coolant and lubricant, is confined to a minimum.

Another advantage of the inventive friction element with a friction surface element according to the invention is that neither a friction lining nor a friction body has to be glued, riveted or secured in any other way to the friction surface element, as known, for example, with respect to clutches from the prior art, since the friction element is formed in one piece.

Thus, it is known to provide so-called radially inwardly or radially outwardly protruding friction lining carriers, for example, with friction linings, which can be glued on, or with a punched hole for receiving ceramic plates, where in this case said friction lining carriers could have a geometry and arrangement at the friction element, which is similar to the friction surface element of the friction element of the invention. In this case, however, only the friction linings or rather the ceramic plates act as the friction partners with a counter disk, so that a radially inwardly or radially outwardly protruding friction surface element, as known from the prior art, was always made in several parts, since it always had one friction lining carrier and at least one friction lining.

The concept "one-piece design" means not only that the friction surface element does not have a friction lining, it also means that the friction surface element is formed in one piece. Hence, an inventive friction element with a friction surface element is always formed in several parts and is not integrally formed, as is the case, for example in DE 10 2014 200 854, where the friction elements are formed with the respective friction surface elements in one piece.

Preferably it can be provided in accordance with an advantageous embodiment of the invention that the frictional shift element is a wet running frictional shift element, in which a fluid, preferably oil, is passed through the friction element pack or, more specifically, the multi-disk pack in the area of the friction surfaces for the purpose of lubrication and cooling.

Preferably the proposed friction element may be usable for a disengaging shift element in automatic transmissions, since with such shift elements, full power shifts are possible without thermally loading this frictional shift element. A disengaging shift element is characterized in that the frictional shift element is engaged in the lowest gear, is disengaged in the highest gear and, upon sequential shifting through all of the gear stages, only changes the shifting state once.

Thus, the proposed friction element produces particularly low drag torques, as a result of which the fuel consumption of the vehicle is significantly reduced. Furthermore, the reduced friction surfaces lead to a lower mass and a small installation space requirement as well as lower costs of manufacturing. Furthermore, the mass moment of inertia is lower, so that it is possible to achieve better driving dynamics with a vehicle that is provided with the frictional shift element, provided with the friction element according to the invention, in the transmission.

In addition, a friction element is preferred that has recesses for receiving the respective friction surface elements. The recesses, also called joining points, may have a back taper or undercut, as a result of which the friction surface element is held in a substantially positive locking manner. How the required back taper or undercut is designable is known, for example, from puzzle pieces or the prior art. Preferably the respective recess is an interference fit.

Furthermore, it is preferred that the recesses partially interrupt the approximately annular base body along its inner circumference or outer circumference.

Furthermore, it is preferred that the friction surface element be formed on the annular friction element over various radii located one behind the other. In particular, it is preferred that the recesses and their immediate surroundings define the friction surface element zones, and that the respective intermediate zones be arranged between the friction surface element zones adjoining in the circumferential direction, wherein the respective intermediate zone has a central zone and two transition zones, enclosing the central zone, wherein said central zone has a first radius $R_3$, and the respective transition zone has a radius $R_4$; and wherein each transition zone is tangential to a central zone and a friction surface element zone.

The radius may be, for example, greater in the area of the outer circumference of the annular base body of the friction element than at the end of the tooth-shaped friction surface of the friction surface element. In this way the transition from the protruding friction surface element to the base body is optimized with respect to its stress distribution. The annular cross section is enlarged in the direction of the friction surface element, so that, on the whole, the multi-disk pack may be more compact in the radial direction. Consequently, upon transmission of power, the friction surface element introduces a bending moment into the annular geometry. In order to optimize the resulting stress flow at the friction element, it is advisable to begin the curvature, based on the annular geometry, initially with a larger radius and then to continue with a smaller radius in the direction of the friction surface element. The geometric shape or rather the course of the radii at the friction surface element may be different on both sides of the friction tooth or rather the friction surface element 5 (preferred direction of rotation).

It is also preferred that the friction surface elements be fixed by fixing means on the friction element. In particular, it is preferred that the friction surface elements be fixed by forming on the friction element. In this way the friction surface element is securable in the disk, in particular, against slipping out laterally, particularly axially.

Moreover, it is preferred that the friction surface elements be fixed on the friction element at least point by point along a joint line. The joint line is that line which defines, when viewed from the axial direction, the extension of the recess in the circumferential direction and/or in the radial direction. The friction surface elements are secured by forming on the approximately annular base. The joining process can be carried out in individual areas, i.e., point by point, of the joint line or even along the entire joint line. For example, it is possible to achieve by caulking a positive and non-positive connection between the friction element and the friction surface element through plastic deformation of an edge region of at least one of the parts, i.e., the friction element or the friction surface element. In contrast to welding, different materials are joinable together. In addition, higher torques are transmittable over caulked connections.

Furthermore, it is preferred that the friction surface elements have chamfers along the joint line. The fixing further simplifies a chamfer at the respective thinner part in the area of the joint line.

In addition, it is preferred that the friction surface elements be welded to the friction element. One advantage of welding is that it is possible to dispense with fixing by forming for the friction surface elements that are connected in a positive locking manner. In this case it is also possible to dispense with a back taper or undercut.

Moreover, it is preferred that the friction element have at least a first thickness in the axial direction and that the respective friction surface element have at least a second thickness in the axial direction, wherein the at least first thickness and the at least second thickness are not the same. It is particularly preferred that the second thickness, i.e., the thickness of the friction surface element, be less than the first thickness, i.e., the thickness of the friction element. This feature allows each of the components to be optimized specifically for their requirements. For example, it simplifies the fixing of the slightly thinner friction surface element by the forming process.

Furthermore, it is preferred that the friction surface elements have chamfers in an inlet and/or an outlet area in the circumferential direction. If the chamfers are introduced at those points, where a counter-friction element, for example, a counter-disk runs into and/or ends in the friction zone, then the drag torque is further reducible.

Furthermore, it is preferred that the friction surface elements have grooves. A suitable grooving, for example, a parallel groove, a waffle groove, a bottleneck groove, analogous to paper linings, allows the drag torque to be significantly reduced even more and at the same time allows the stability under load to increase.

Furthermore, it is preferred that the friction surface elements be made of steel. Moreover, it is preferred that the friction surface elements be sintered. It is also preferred that the friction surface elements be made of ceramic.

It is also preferred that the friction surface element be beveled or conical in the cross section or in the axial direction. Due to the fact that, for example, the internal and/or external friction elements are flattened, there is a reduction in the amount of installation space required in the axial direction. Furthermore, a higher degree of strength is attained at the same time, because the disk or, more specifically, the friction element is thicker or rather stronger in the highly stressed areas. In particular, areas where the synchronized gear tooth system is provided on the friction element are referred to as the highly stressed areas. In addition, this aspect results in better heat dissipation, since the friction surface elements are attached to the annular cross section of each friction element over a wider area. As a result, the resistance to thermal stress is higher. In addition, it is advantageous that owing to the flattening or rather the cone effect, lower axial contact forces are necessary in order to engage the frictional shift element. Furthermore, a lower degree of forming is required to produce the friction element.

According to another aspect of this invention, a method for producing a friction element for a transmission of a vehicle, wherein the frictional shift element has an approximately annular base body, wherein the approximately annular base body has a plurality of friction surface elements, which protrude radially inwardly or radially outwardly and are arranged so as to be distributed over the periphery, said method including the steps of:

manufacturing the approximately annular base body from a first material in a first step, manufacturing a plurality of recesses (16), which interrupt the annular base body along its inner circumference or outer circumference, in a second step (120), wherein the recesses (16) are used to receive friction surface elements formed as one piece (5), manufacturing the friction surface elements as one piece (5) from the first material or a second material in a third step.

The advantage of the method according to the invention is that it is possible to manufacture a friction element, for example, an internal disk or an external disk, that causes small drag torques at a significant reduction in weight and can transmit high torques.

Additionally, in contrast to the prior art, this inventive feature allows the corresponding coaxially arranged pairs of disks to be manufactured "in each other". That means that there are not two internal parts to scrap, an aspect that usually occurs when the disks are manufactured by the conventional method.

Particularly preferred is a method, in which the friction surface elements are joined to the recesses.

Furthermore, preference is given to a method including the step of fixing the friction surface elements to the approximately annular base body by a forming process, wherein the forming process is carried out at the friction surface element and/or at the approximately annular base body at least point by point along a joint line.

In addition, a method is preferred, in which the friction surface elements are welded to the approximately annular base body. The advantage of this method is that it is possible to dispense with an undercut or back taper of the joining point and the friction surface elements.

In addition, a method is preferred, in which the manufacturing is equivalent to punching, for example, combination punching.

The friction element may be provided for a frictional shift element, which is actuatable hydraulically, pneumatically, electro-mechanically or mechanically. Preferably the wet-running frictional shift element is actuated hydraulically, since the existing coolant and lubricant is usable as the hydraulic medium. The friction element may be made of sheet metal, steel or the like. The steel may contain carbon, for example, C15, C60, C75. The friction element may be hardened (for example, nitrocarburized or gas nitrided). As the coating of the friction element, it is possible to provide, analogously to synchronization, for example, sintering, molybdenum, carbon or the like.

The proposed friction element is usable in a frictional shift element of a power shifting transmission. It is also conceivable that the friction element is usable in a frictional shift element of a continuously variable multi-range transmission or an electric vehicle drive. Additional possible applications are as an all-wheel decoupling, retarder decouplings, a quick-reversing group and a range group.

The present invention claims, in addition to the above described friction element, an automatic transmission for a vehicle with such a friction element.

BRIEF DESCRIPTION OF THE DRAWINGS

Other advantages and advantageous embodiments of the subject matter of the invention will become apparent from the patent claims and the exemplary embodiments described below, in principle, with reference to the drawings, and for the sake of clarity the same reference numerals are used for components that are structurally and functionally the same in the description of the various exemplary embodiments.

In the drawings, the following is shown:

FIG. 10 shows an enlarged detail of the inventive friction element in another preferred embodiment with the friction surface element welded on;

FIG. 18 shows an exemplary process of the inventive method for producing an inventive friction element with the friction surface elements welded-on.

FIGS. 1 to 16 show multiple embodiments of an inventive friction element for a frictional shift element of a transmission of a vehicle, for example a multi-disk shift element.

FIGS. 17 and 18 show exemplary processes for producing said friction elements.

DETAILED DESCRIPTION

Figure 1:
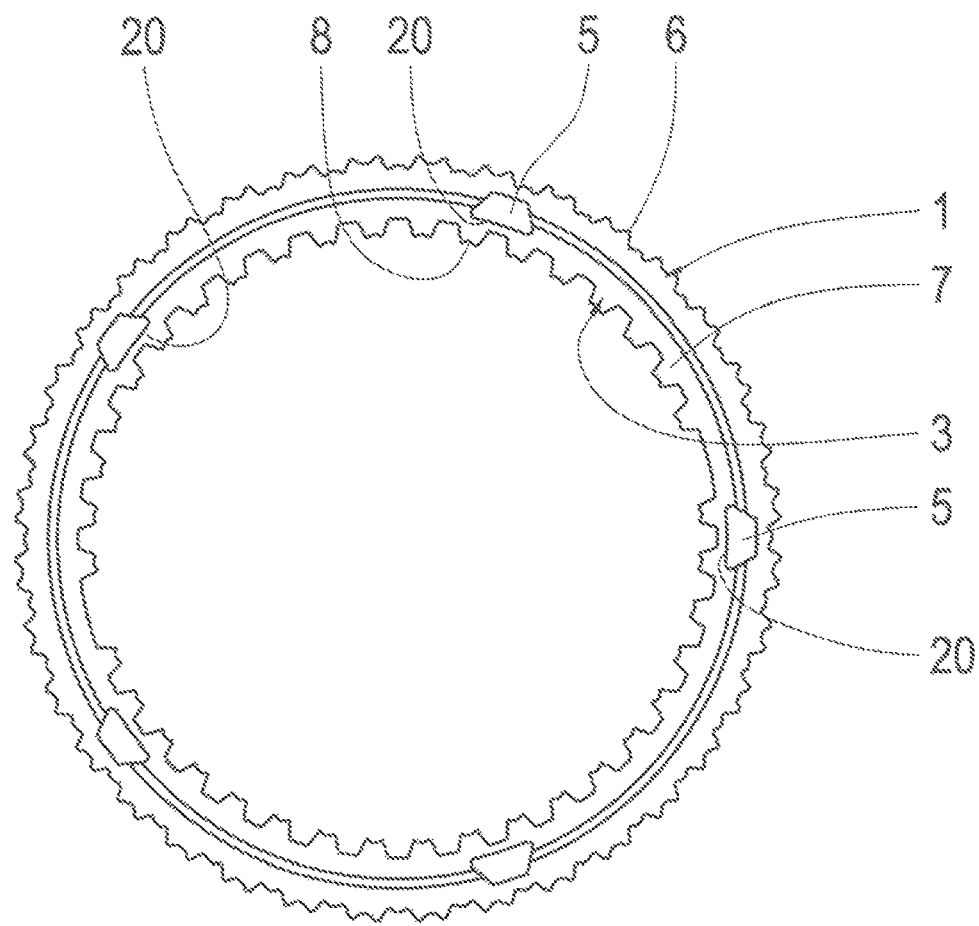
FIGS. 1 and 2 show a first embodiment of the inventive friction element with a plurality of welded-on, radially outwardly protruding friction surface elements in a front view and a side view.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

A plurality of friction elements 1, which are mounted in a rotationally rigid manner on a first carrier 2, and a plurality of friction elements 3, which are mounted in a rotationally rigid manner on a second carrier 4, form a frictional shift element.

The friction elements 1, 3 are alternately arranged one behind the other as a multi-disk pack, so that overlapping friction surfaces are produced in each case between a friction element 1 and a friction element 3. For the transmission of torque, the friction elements 1 and 3 are pressed together in the axial direction. Each of the friction elements 1, 3 has a friction surface that is approximately annular, and each of the other friction elements 1, 3 has, as the corresponding friction surface, a plurality of friction surface elements 5 that protrude radially in the overlap area.

Figure 2:
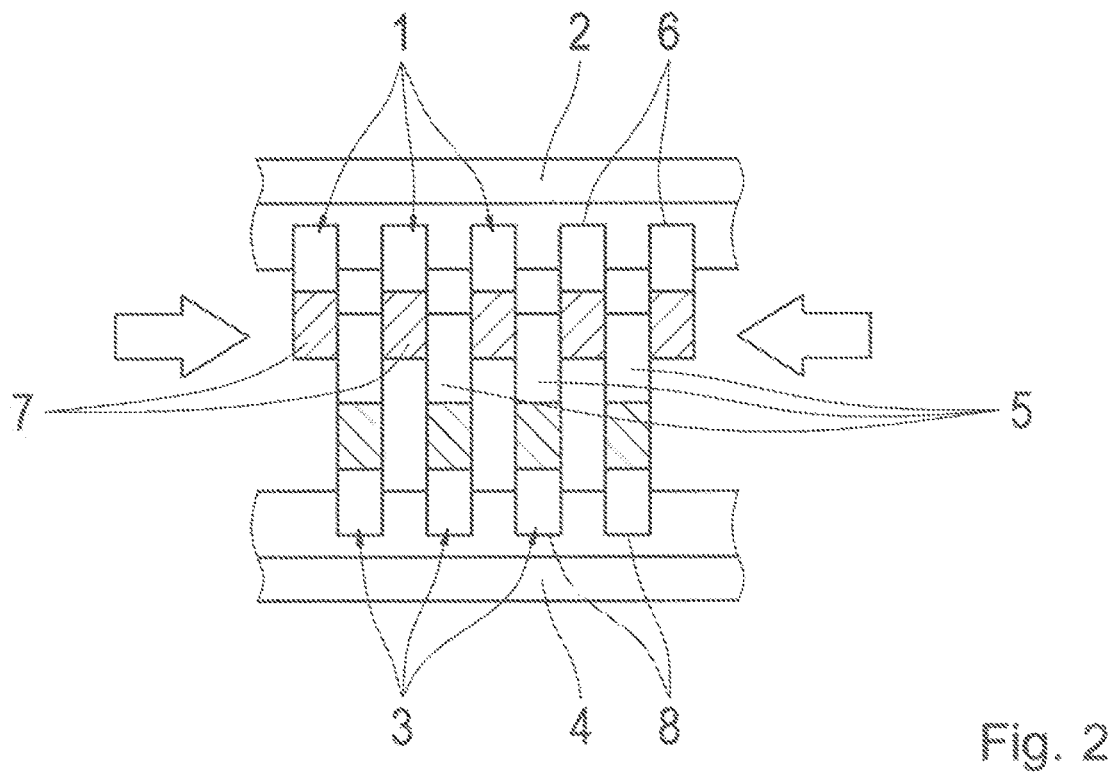

FIGS. 1 and 2 provide a first embodiment, in which the friction element 1 is the external disk, and the inventive friction element 3 is the internal disk, and each external disk, which is approximately annular, has an external synchronized gear tooth system 6 for connecting to the external multi-disk carrier 2 and an approximately annular friction surface 7. The internal disk, i.e., the friction element 3, has an internal synchronized gear tooth system 8 for connecting to the internal multi-disk carrier 4 and a plurality of friction surface elements 5, which protrude radially outwardly, are distributed over the circumference and overlap with the annular friction surface 7 of the external disk. The friction element 3, according to the invention, has five recesses 16, to which a friction surface element 5 is welded in each case, a feature that is shown by a weld 20.

Figure 3:
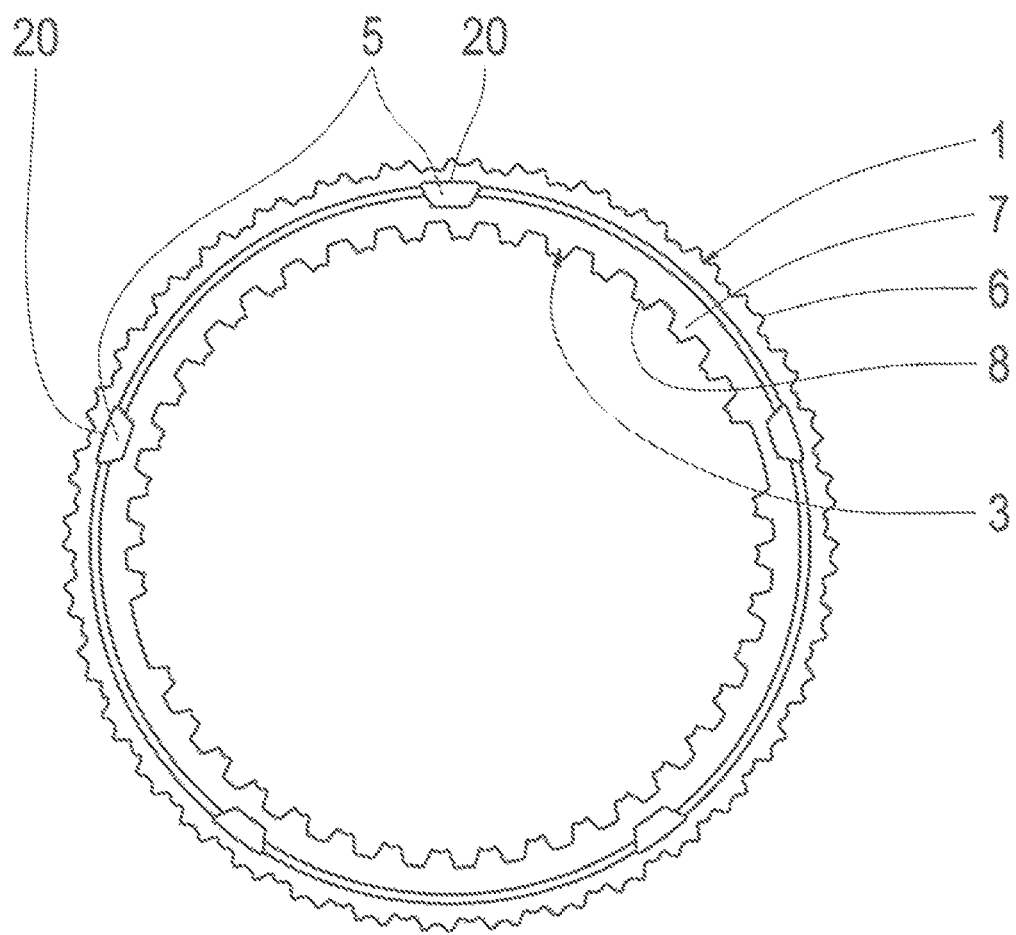
FIGS. 3 and 4 show an additional embodiment of the inventive friction element with a plurality of welded-on, radially inwardly protruding friction surface elements in a front view and a side view.
Figure 4:
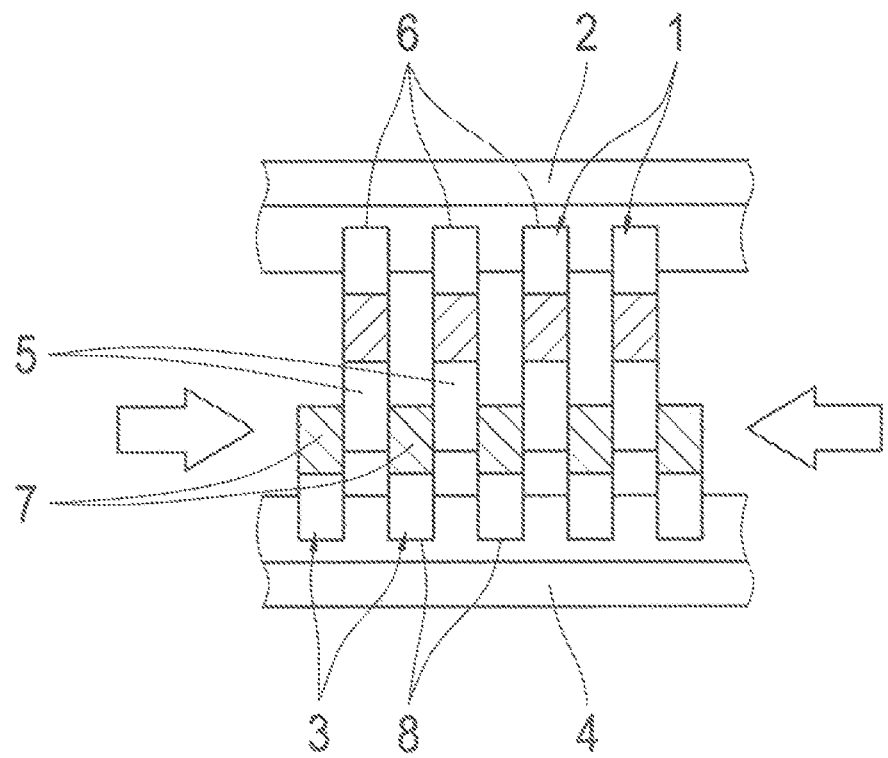

In contrast to the embodiment shown in FIGS. 1 and 2, the second embodiment, shown in FIGS. 3 and 4, provides that the friction surface elements 5 are provided on the friction element 1, the external disk, and the annular friction surface 7 is provided on the second friction element 3, which is the internal disk. The friction surface elements 5 are arranged such that they protrude radially inwardly, are distributed over the circumference, and overlap with the annular friction surface 7. The arrows to the multi-disk packs, shown in FIGS. 2 and 4, illustrate the acting axial forces for engaging the frictional shift element of the invention. The friction element 1, according to the invention, has five recesses or joining points 16, to which a friction surface element 5 is welded in each case, a feature that is shown by a weld 20.

Independently of the two embodiments in accordance with FIGS. 1 to 4, it is provided that the friction elements 1, 3, which can be brought into frictional engagement with each other, are spaced apart from each other in the radial direction, irrespective of the protruding friction surface elements 5.

The friction surface elements 5, shown in FIGS. 1 to 4, are welded to the friction elements 1 or 3, so that a plurality of separate tooth-shaped friction surfaces or rather contact surfaces are provided in the circumferential direction; and in the engaged state of the frictional shift element, these surfaces can be brought into contact with the approximately annular friction surface 7. The friction surface elements 5 are optimizable with respect to length and width ratio, angle, edge shape and surface structure, in order to create a friction element that can be manufactured as cost effectively as possible and causes a low drag torque.

Inside the synchronized gear tooth system 6, 8, there are different geometries, such as, for example, different tooth widths and/or different tooth gap widths and/or different tooth angles, in order to force, in combination with a corresponding carrier 2, 4, an assembly with the friction surface elements 5 arranged congruently one on top of the other in the axial direction.

Figure 5:
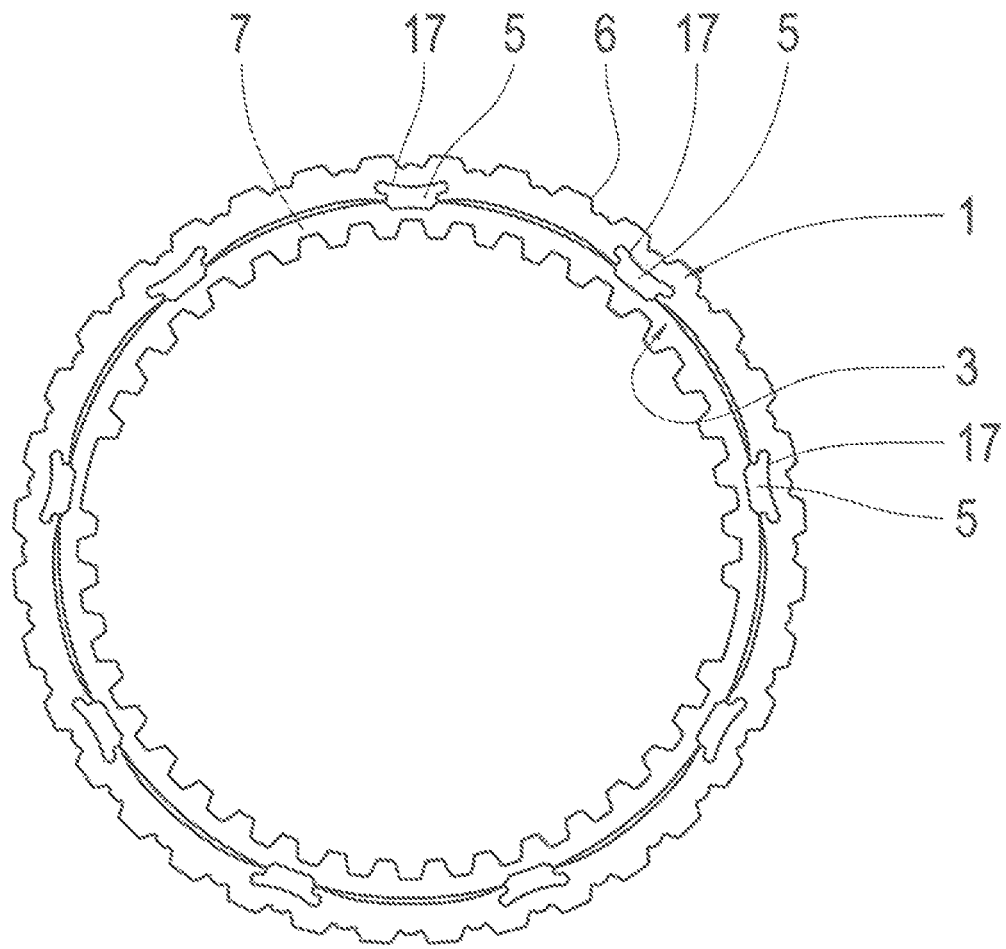
FIG. 5 shows another preferred embodiment of the inventive friction element with inserted, radially inwardly protruding friction surface elements in an axial front view.

FIG. 5 shows another preferred friction element 1 of the invention with inserted friction surface elements, which protrude radially inwardly. In contrast to FIGS. 1 to 4, nine friction surface elements 5 are inserted into the joining points 16, which are provided for this purpose, along a joint line 17. The joint line 17 defines the joining point 16 in the circumferential and radial direction. The joining points 16 in FIG. 5 differ from the joining points 16 in FIGS. 1 to 4 in that they have back tapers 18, as a result of which the friction surface elements 5 are held in an essentially form-fitting manner. The joint line 17 defines the joining point 16 in the circumferential and radial direction.

Of course, any other number of friction surface elements is also possible. In addition, the shape of the friction surface elements (length/width ratio, angle, edge shape, surface structure) may be freely optimized.

Figure 6:
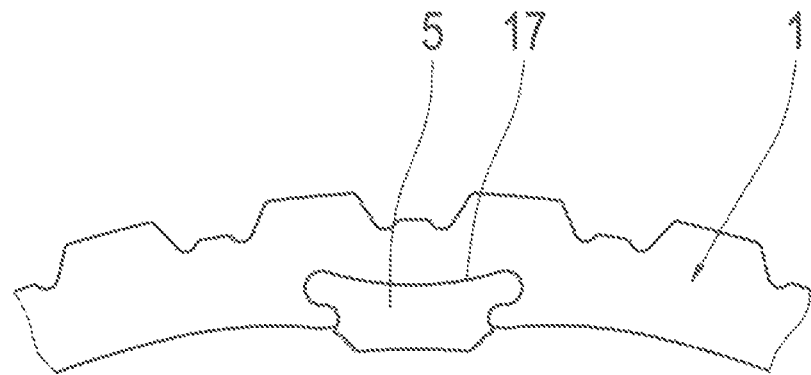
FIG. 6 shows an enlarged detail of the inventive friction element with inserted friction surface element from FIG. 5.

FIG. 6 shows an enlarged detail of the friction element 1 of the invention with the friction surface element 5 inserted. The friction surface element is held by a back taper 18 along the joint line 17 in an essentially form-fitting manner, as known, for example, from puzzle pieces.

Figure 7:
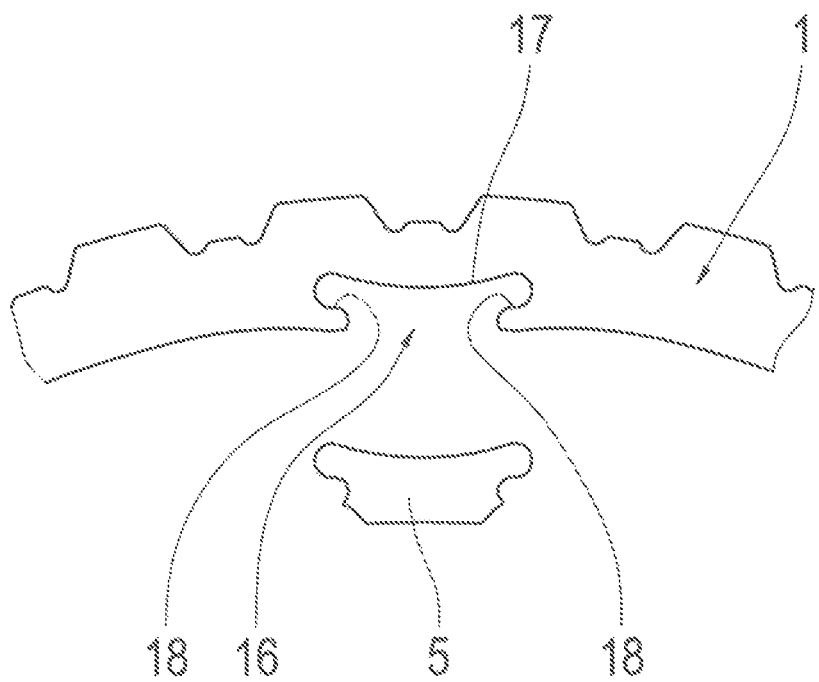
FIG. 7 shows the friction element and the friction surface element from FIG. 6 in the non-inserted state.

FIG. 7 shows the friction element and the friction surface element from FIG. 6 in a non-inserted state.

Figure 8:
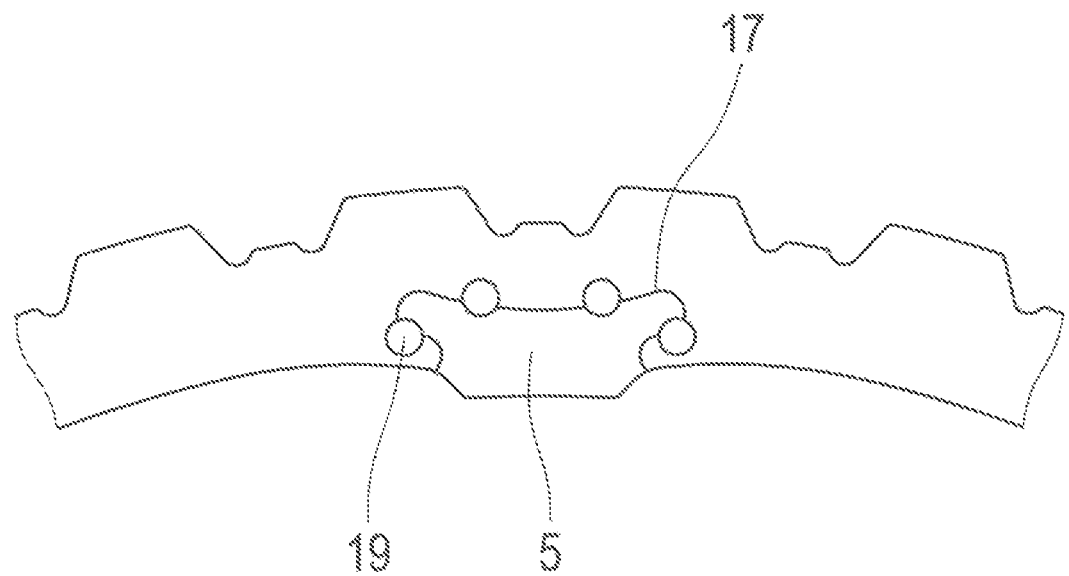
FIG. 8 shows the inserted friction surface element from FIG. 6, which is fixed by fixing means along a joining point.

FIG. 8 shows the inserted friction surface element 5 from FIG. 6, which is also secured at the joining point 16 by four fixing means 19. In this case a forming process has been carried out at four points, thus point by point, along the joint line 17 either at the friction element 1 and/or at the friction surface element 5, in order to secure the friction surface elements 5 against falling out laterally.

Figure 9:
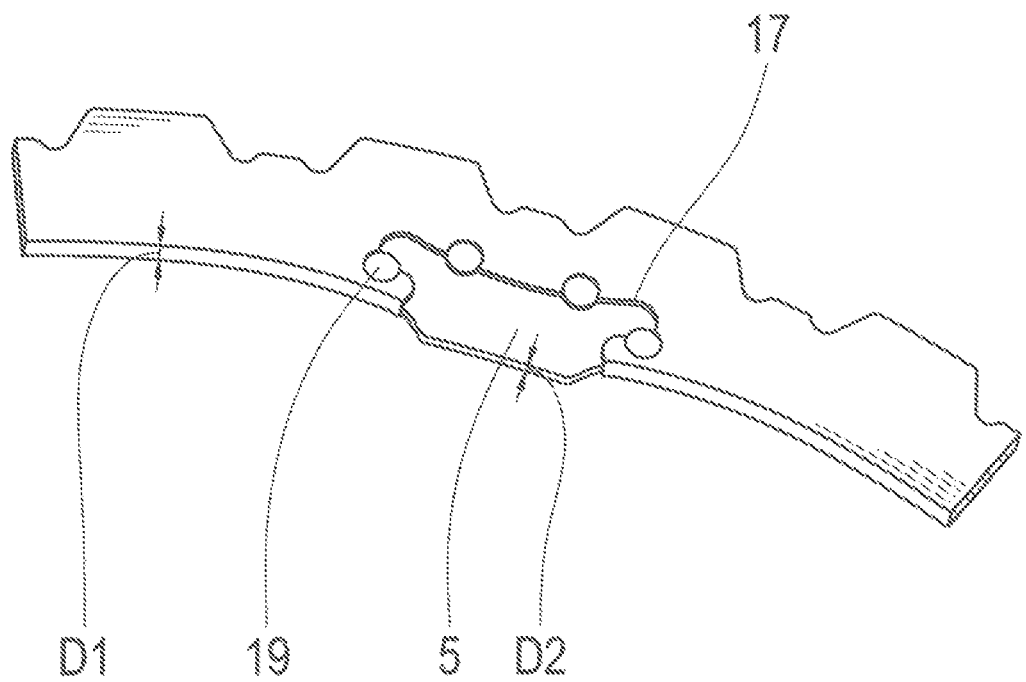
FIG. 9 shows the inserted friction surface element from FIG. 8 in a perspective view.

FIG. 9 shows the inserted friction surface element 5 from FIG. 8 in a perspective view. The friction surface element 5 has a thinner thickness D2 than the external disk 1 having a thickness D1. This feature simplifies the fixing by the forming process. In this case the forming is shown only point by point, but could also be carried along the entire joint line 17.

Figure 10:
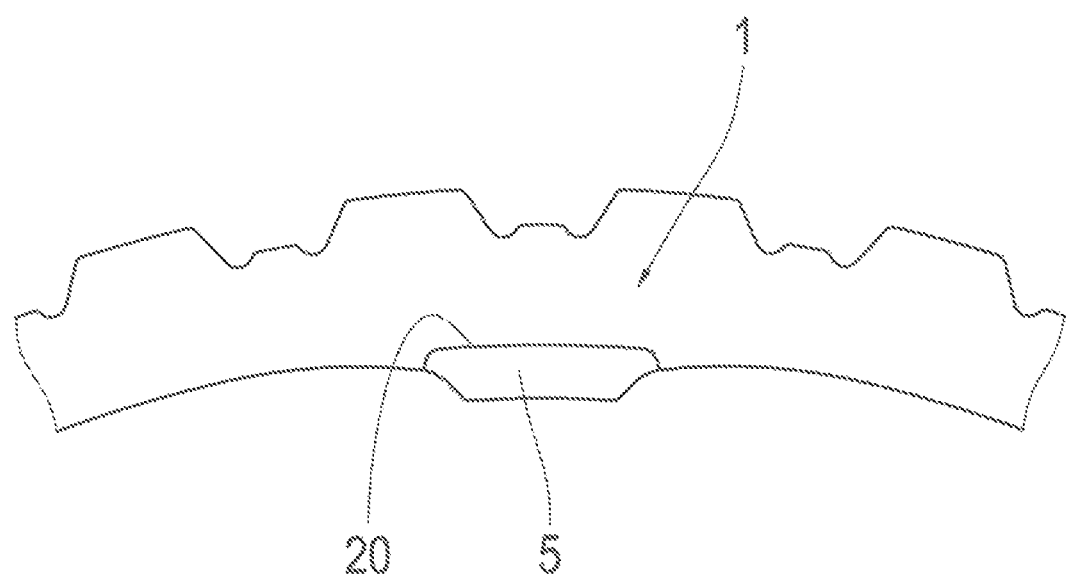

FIG. 10 shows an enlarged detail of the friction element 1 of the invention with the welded-on friction surface element 5 from FIGS. 3 to 4. Then it is possible to dispense with the back taper 18.

Figure 11:
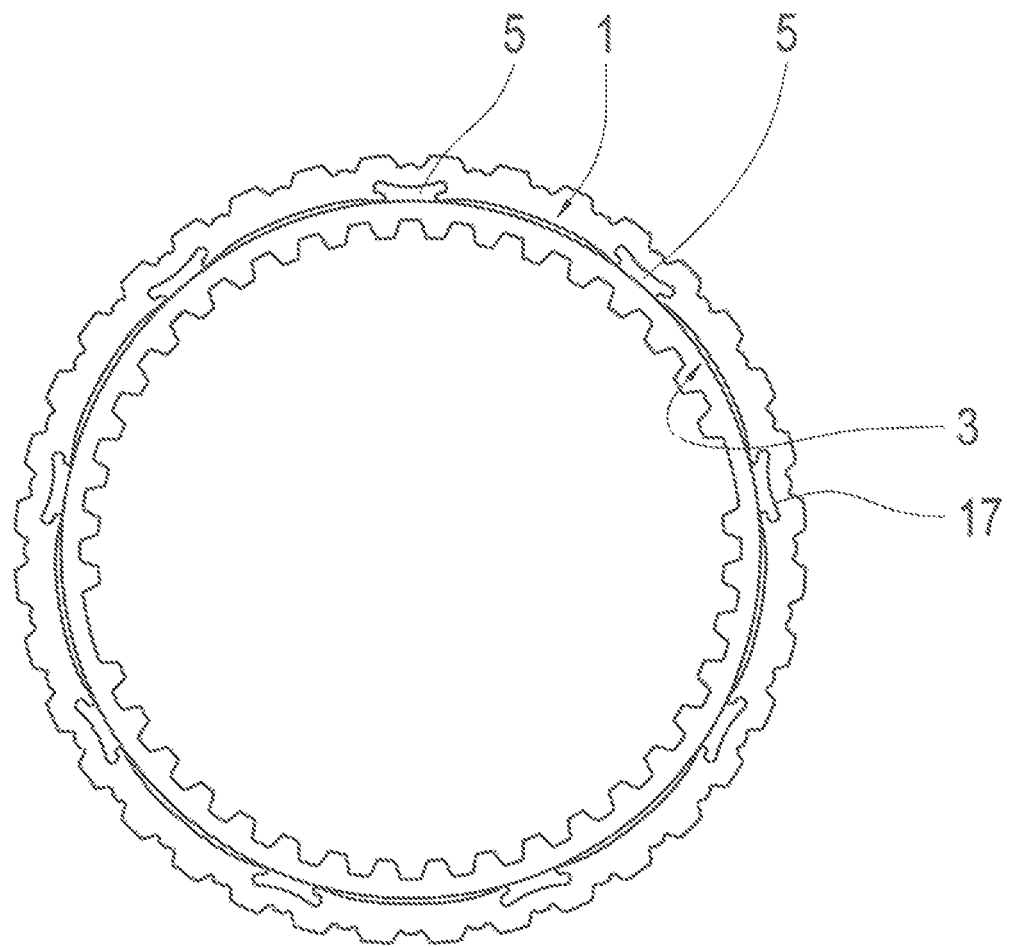
FIG. 11 shows the friction element from FIG. 5 in a rear view.

FIG. 11 shows the inventive friction element being the external disk (shown in FIG. 5), in a rear view. It can be seen very clearly, that the annular base bodies of the two disks 1, 3 are radially spaced from one another. FIG. 11 also shows that the internal disk 3 is coaxial to the external disk 1 of the invention. Therefore, an internal part does not have to be scrapped twice.

Figure 12:
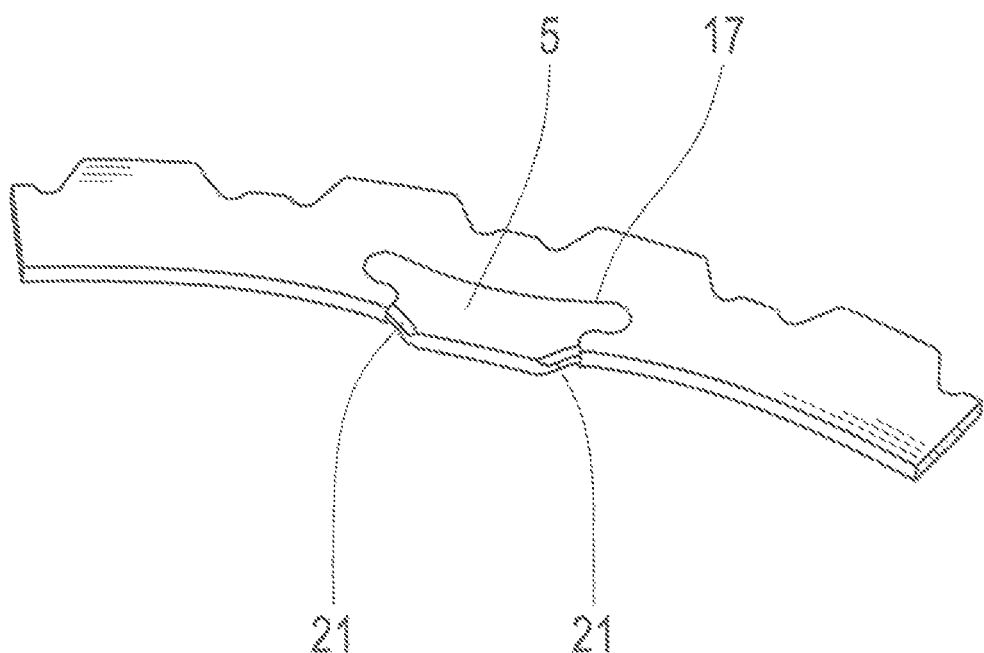
FIG. 12 shows an enlarged detail of another embodiment of the inventive friction element with chamfers arranged on the friction surface element.

FIG. 12 shows an enlarged detail of the inventive friction surface element 5 from FIG. 6 with chamfers 21. These chamfers are milled in areas of an inlet and/or outlet zone. As a result, the drag torques are further reduced.

Figure 13:
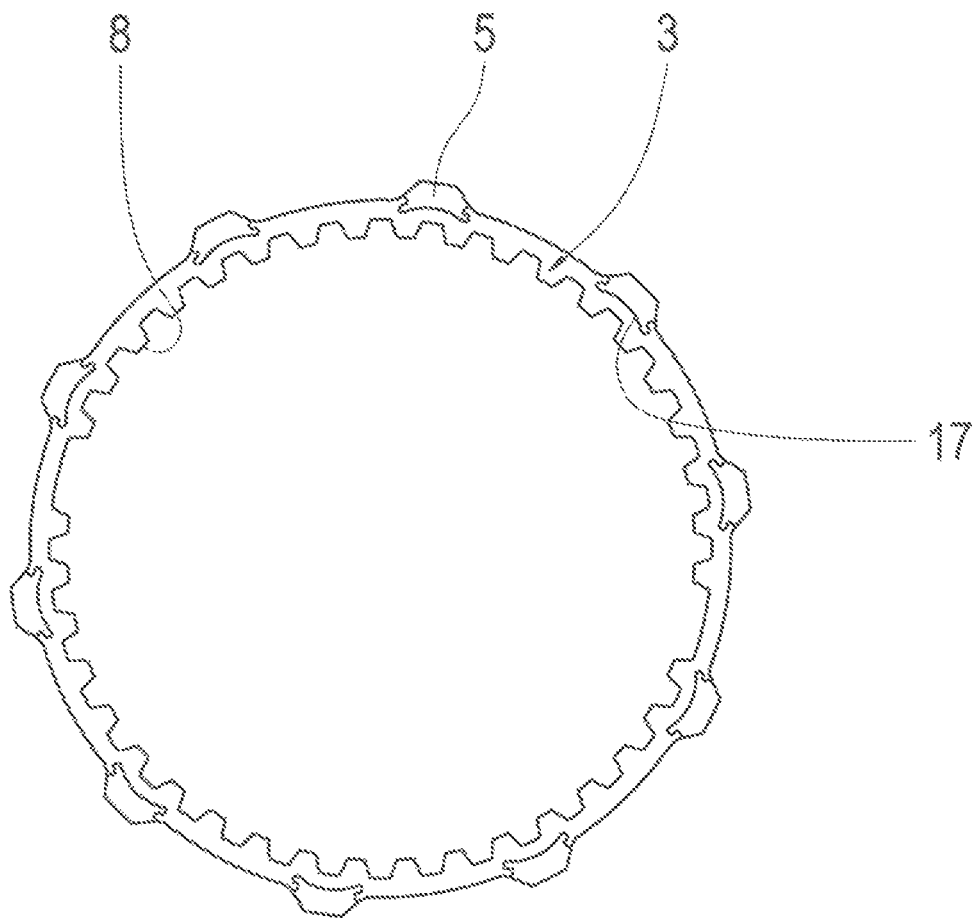
FIG. 13 shows an additional embodiment of the inventive friction element with radially outwardly protruding, inserted friction surface elements.

FIG. 13 shows an additional embodiment of the inventive friction element 3, the internal disk, with friction surface elements 5 that protrude radially outwardly, where in contrast to FIGS. 1 to 2, the friction surface elements are inserted and not welded on.

Figure 14:
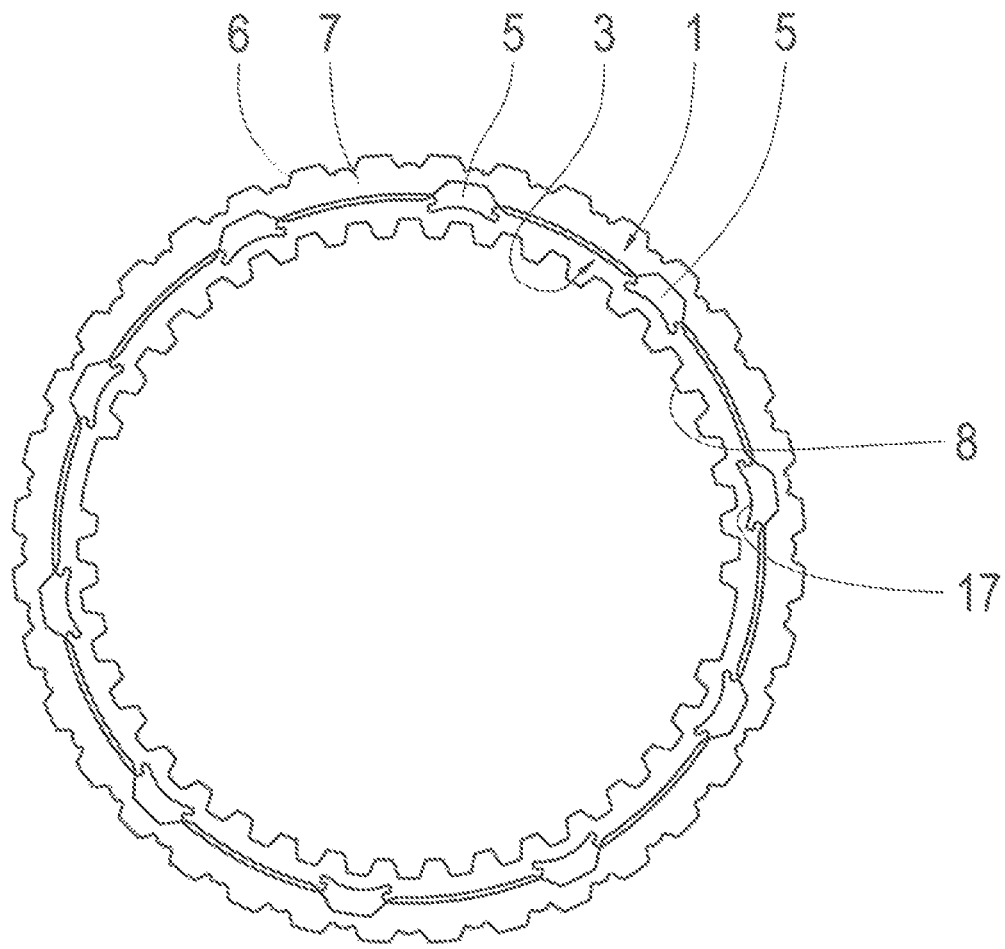
FIG. 14 shows the inventive friction element from FIG. 13 in a coaxial arrangement to a friction element is an external disk.

FIG. 14 shows the inventive internal disk 3 from FIG. 13 arranged coaxially to a corresponding external disk 1. In contrast to FIGS. 1 to 2, the friction surface elements 5 are inserted and not welded on.

In contrast to FIG. 5, the internal disk 3 receives the friction surface elements 5, not the external disk 1.

Figure 15:
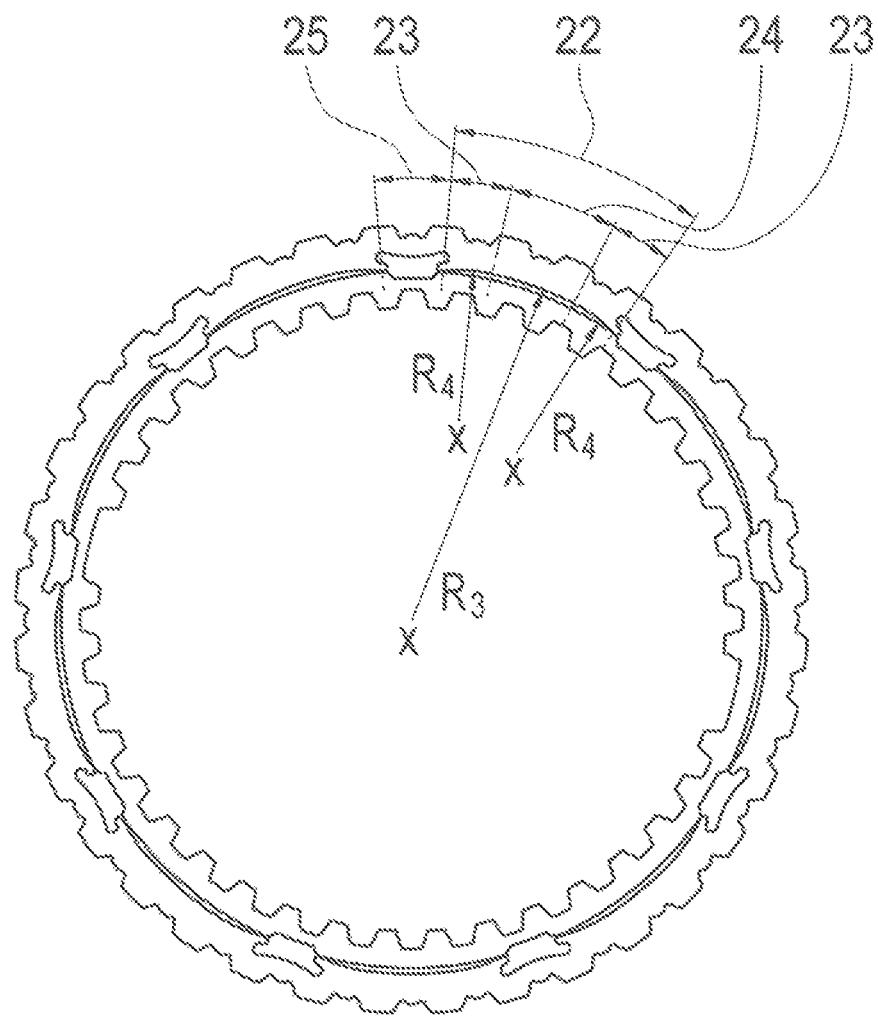
FIG. 15 shows a preferred geometry of the inventive friction element from FIG. 5.

FIG. 15 shows a geometry of an embodiment of the invention. In this case, the recesses, i.e., the joining points 16, and their immediate surroundings define the friction surface element zones 25. The respective intermediate zones 22 are arranged between the friction surface element zones 25, adjacent in the circumferential direction, wherein the respective intermediate zone 22 has a central zone 24 and two transition zones 23, enclosing the central zone 24, wherein said central zone 24 has a radius R3; and the respective transition zone 23 has a radius R4; and wherein each of the transition zones 23 is tangential to a central zone 24 and a friction surface element zone 25.

In this way the transition from the projecting friction surface element 5 to the base body is optimized with respect to its stress distribution.

Figure 16:
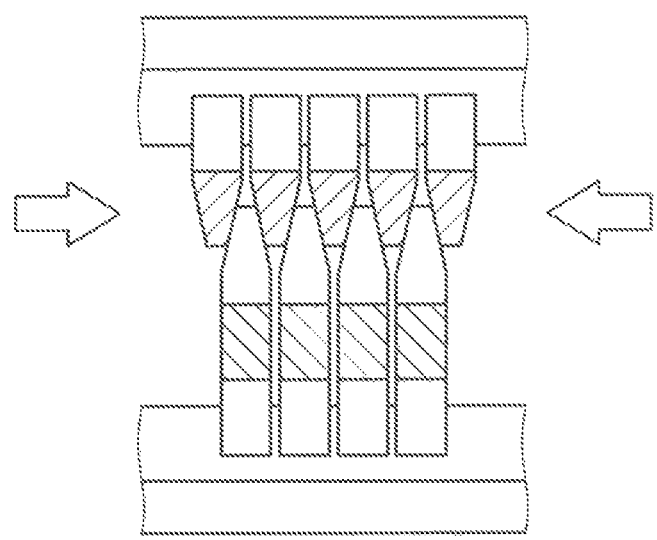
FIG. 16 shows another embodiment in a side view.

FIG. 16 shows an additional embodiment with a friction element, designed to be conical, in a side view. In this case both the inventive friction elements 3, which are the internal disks, and also the adjacent counter-disks on the friction surfaces, which face each other, are beveled or conical in the cross section. In particular, owing to the cone effect, lower axial contact forces are required. In this embodiment the axial tapering of the friction surface elements 5 and the friction surfaces 7 is symmetrical. An asymmetrical or unilateral flattening is also possible.

Figure 17:
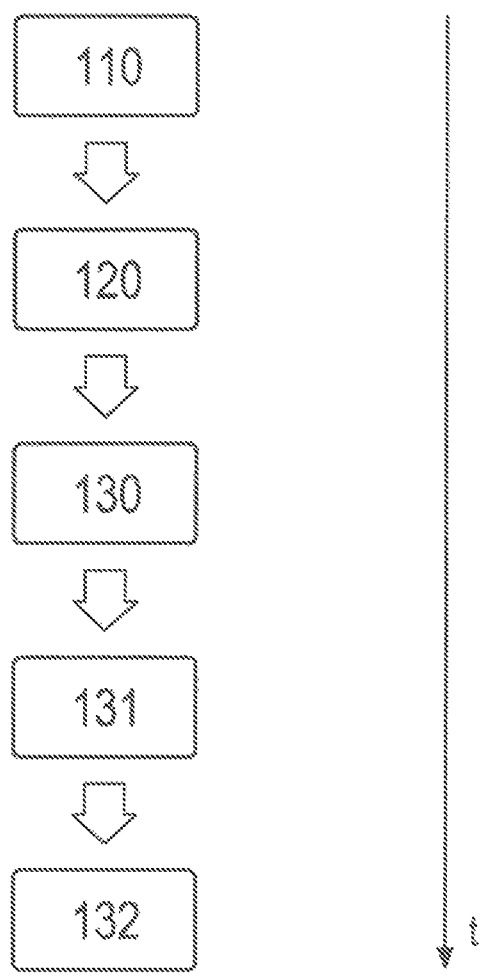
FIG. 17 shows an exemplary process of the inventive method for producing an inventive friction element with the friction surface elements inserted.

FIG. 17 (with inserted friction surface elements 5) and 18 (with welded-on friction surface elements 5) show an exemplary process of the inventive method for producing an inventive friction element.

In FIG. 17 a friction element 3, as an internal disk, is punched initially out of a sheet metal strip in a first step 110. In a subsequent step 120, the recesses 16, as the jointing points, are punched with back tapers into the internal disk 3. In a subsequent step 130 the friction surface elements 5, which are friction teeth, are produced. In this case the friction teeth 5 may be of the same material as the internal disk 3 or a different material. In a subsequent step 131 the friction teeth 5 are inserted into the joining points 16. In a subsequent step 132 the friction teeth are fixed by caulking to the internal disk 3 in the area of the joint line 16, so that a non-releasable positive and non-positive connection is produced.

For the person skilled in the art it is clear that the method, shown in FIG. 17, represents merely an exemplary method of the invention. It goes without saying that additional steps or fewer steps for manufacturing are conceivable, for example, steps for manufacturing the synchronized gear tooth system or, for example, because certain steps can take place simultaneously. Thus, it is, in particular conceivable to carry out the steps 110 and 120, the punching of the disk and the jointing points, simultaneously. The recesses 16 may also be punched into the external disk 1. Then the friction teeth 5 would protrude correspondingly radially inwardly.

Figure 18:
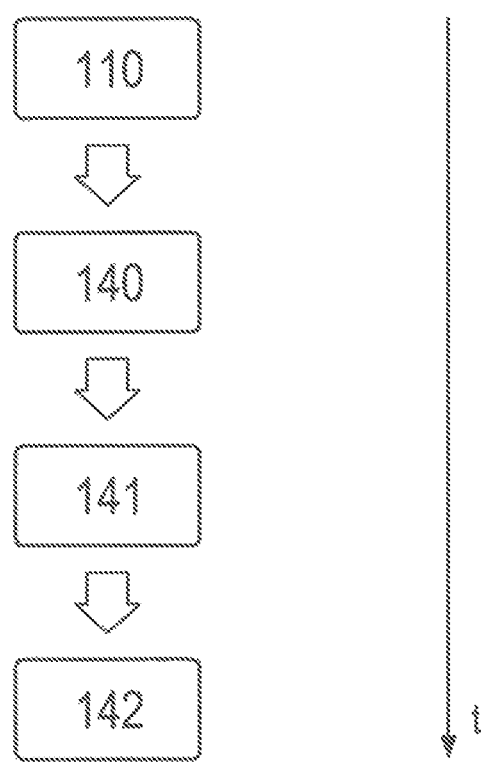

The step 110 in FIG. 18 is identical to that in FIG. 17. In a step 140 following the step 110, the recesses 16 are punched into the internal disk 3 without back tapers 18. Then in a subsequent step 141, the friction teeth 5 are produced. Subsequently in a step 142 the friction teeth 5 are welded to the joining points 16 that are provided for this purpose.

In this case, too, it is clear to the person skilled in the art that the method, shown in FIG. 18, represents merely an exemplary method of the invention. It goes without saying that additional steps, for example, steps for manufacturing the synchronized gear tooth system, or also fewer steps for manufacturing are conceivable. It is also possible to weld the friction teeth to the joining points 16, punched into the external disk 1, so that they then protrude radially inwardly.

Modifications and variations can be made to the embodiments illustrated or described herein without departing from the scope and spirit of the invention as set forth in the appended claims.

LIST OF REFERENCE NUMERALS AND SYMBOLS 1 first friction element or disk, external disk
2 first carrier 3 second friction element or disk, internal disk
4 second carrier
5 friction surface element, friction tooth
6 synchronized gear tooth system of the first friction element
7 annular friction surface
8 synchronized gear tooth system of the second friction element
16 recess, joining point
17 joint line
18 back taper, undercut
19 fixing means
20 weld
21 chamfers
22 intermediate zone
23 transition zone
24 central zone
25 friction surface element zone
D1 first thickness, friction element
D2 second thickness, friction surface element
R3 radius central zone
R4 radius transition zone

The invention claimed is:

1. A friction element (1, 3) for a frictional shift element for a transmission of a vehicle, comprising:
   an annular base body defining a plurality of recesses (16) distributed over a periphery of the annular base body; and
   a plurality of friction surface elements (5), each of the plurality of friction surface elements (5) being received in a respective one of the plurality of recesses (16) such that the plurality of friction surface elements (5) protrude radially inwardly or radially outwardly from the annular base body,
   wherein the annular base body and the plurality of friction surface elements (5) are each formed as one piece, and
   wherein each of the plurality of friction surface elements (5) is fixed to the annular base body.

2. The friction element (1, 3) of claim 1, wherein the plurality of recesses (16) are distributed on the annular base body along an inner circumference of the annular base body or an outer circumference of the annular base body.

3. The friction element (1, 3) of claim 1, further comprising:
   a plurality of friction surface element zones (25); and
   a plurality of intermediate zones (22),
   wherein each of the plurality of friction surface element zones (25) is defined by one of the plurality of recesses (16),
   wherein each of the plurality of intermediate zones (22) is arranged between a pair of circumferentially adjacent friction surface element zones of the plurality of friction surface element zones (25),
   wherein each of the plurality of intermediate zones (22) has a central zone (24) between two transition zones (23), the central zone (24) has a first radius R3, each of the two transition zones (23) has a radius R4, and each of the two transition zones (23) is tangential to the central zone (24) and a respective one of the plurality of friction surface element zones (25).

4. The friction element (1, 3) of claim 1, wherein each of the plurality of friction surface elements (5) is fixed by a respective fixing means to the annular base body.

5. The friction element (1, 3) of claim 1, wherein each of the plurality of friction surface elements (5) is fixed to the annular base body at least point by point along a respective joint line (17).

6. The friction element (1, 3) of claim 1, wherein the plurality of friction surface elements (5) is welded to the annular base body.

7. The friction element (1, 3) of claim 1, wherein the annular base body has a first thickness (D1) in an axial direction, and each of the plurality of friction surface elements (5) has a second thickness (D2) in the axial direction, wherein the first thickness (D1) is different from the second thickness (D2).

8. The friction element (1, 3) of claim 1, wherein each of the plurality of friction surface elements (5) has chamfers.

9. The friction element (1, 3) of claim 1, wherein each of the plurality of friction surface elements (5) has grooves.

10. The friction element (1, 3) of claim 1, wherein each of the plurality of friction surface elements (5) is beveled or conical in an axial direction.

11. A friction surface element (5) for the friction element (1, 3) of claim 1.

12. A method for producing a friction element (1, 3) for a frictional shift element for a transmission of a vehicle, the friction element (1, 3) having an annular base body and a plurality of friction surface elements (5), the plurality of friction surface elements (5) being distributed over a periphery of the annular base body and protruding radially inwardly or radially outwardly from the periphery, said method comprising:
   manufacturing the annular base body from a first material in a first step (110);
   manufacturing a plurality of recesses (16) in a second step (120), the plurality of recesses (16) distributed on the annular base body along an inner circumference or an outer circumference of the annular base body;
   manufacturing the plurality of friction surface elements (5) in a third step (130), each of the plurality of friction surface elements (5) being formed as one piece from the first material or a second material in the third step (130), each of the plurality of friction surface elements (5) being receivable within a respective one of the plurality of recesses (16); and
   joining each of the plurality of friction surface elements (5) to the annular base body at the respective one of the plurality of recesses (16) in a fourth step.

13. The method of claim 12, wherein joining the plurality of friction surface elements (5) to the annular base body comprises performing a forming process, wherein the forming process is carried out at each of the plurality of friction surface elements (5) and at the annular base body at least point by point along a respective joint line (17).

14. The method of claim 12, wherein joining the plurality of friction surface elements (5) to the annular base body comprises performing a forming process, wherein the forming process is carried out at each of the plurality of friction surface elements (5) or at the annular base body at least point by point along a respective joint line (17).

15. The method of claim 12, wherein joining the plurality of friction surface elements (5) to the annular base body comprises welding the plurality of friction surface elements (5) to the annular base body.

* * * * *